US009237127B2

(12) United States Patent
Monk et al.

(10) Patent No.: US 9,237,127 B2
(45) Date of Patent: Jan. 12, 2016

(54) METHOD AND APPARATUS FOR DYNAMIC HOST OPERATING SYSTEM FIREWALL CONFIGURATION

(75) Inventors: John Monk, Larkspur, CO (US); Dan Prescott, Elbert, CO (US); Robert Vogt, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 311 days.

(21) Appl. No.: 13/106,820

(22) Filed: May 12, 2011

(65) Prior Publication Data

US 2012/0291115 A1 Nov. 15, 2012

(51) Int. Cl.
H04L 29/06 (2006.01)

(52) U.S. Cl.
CPC ........ H04L 63/0218 (2013.01); H04L 63/0263 (2013.01)

(58) Field of Classification Search
CPC .......................... H04L 63/0218; G06F 9/4881
USPC ...................... 726/1, 11–15, 29; 709/223–225
See application file for complete search history.

(56) References Cited

U.S. PATENT DOCUMENTS

| 6,711,615 | B2* | 3/2004 | Porras et al. ................. 709/224 |
| 7,707,578 | B1* | 4/2010 | Zedlewski et al. ............ 718/102 |
| 8,015,383 | B2* | 9/2011 | Shultz et al. ................. 711/170 |
| 8,060,760 | B2* | 11/2011 | Shetty et al. ................. 713/300 |
| 8,347,302 | B1* | 1/2013 | Vincent et al. ................ 718/104 |
| 8,352,608 | B1* | 1/2013 | Keagy et al. .................. 709/226 |
| 2005/0015624 | A1* | 1/2005 | Ginter et al. ................. 713/201 |
| 2005/0097339 | A1* | 5/2005 | Wiley et al. .................. 713/188 |
| 2006/0064697 | A1* | 3/2006 | Kagi et al. .................... 718/103 |
| 2006/0206300 | A1* | 9/2006 | Garg et al. ....................... 703/27 |
| 2007/0180449 | A1* | 8/2007 | Croft et al. ........................ 718/1 |
| 2007/0244972 | A1* | 10/2007 | Fan .............................. 709/205 |
| 2009/0241192 | A1* | 9/2009 | Thomas ............... G06F 21/577 726/23 |
| 2010/0125667 | A1* | 5/2010 | Soundararajan ............ 709/227 |
| 2012/0084381 | A1* | 4/2012 | Alladi ..................... G06F 9/544 709/213 |

OTHER PUBLICATIONS

Ioannidis et al.; Implementing a distributed firewall; Published in: Proceeding CCS '00 Proceedings of the 7th ACM conference on Computer and communications security; 2000; pp. 190-199; ACM Digital Library.*

Payne et al.; Architecture and applications for a distributed embedded firewall; Published in: Computer Security Applications Conference, 2001. ACSAC 2001. Proceedings 17th Annual; Date of Conference: Dec. 10-14, 2001 ; pp. 329-336; IEEE Xplore.*

* cited by examiner

*Primary Examiner* — Bradley Holder
(74) *Attorney, Agent, or Firm* — Locke Lord LLP; Scott D. Wofsy; Christopher J. Capelli

(57) ABSTRACT

A method and apparatus for dynamic host operating system firewall configuration provides plural monitoring processes to monitor the firewall configuration of a host operating system and guest operating systems. When any firewall configuration change is detected by a monitor in a monitored guest operating system, an appropriate corresponding firewall change is made by the monitor to the host operating system.

12 Claims, 4 Drawing Sheets

METHOD AND APPARATUS FOR DYNAMIC HOST OPERATING SYSTEM FIREWALL CONFIGURATION

BACKGROUND OF THE INVENTION

This invention relates to networking, and more particularly to monitoring of guest operating systems in a virtualized system.

In a computer virtualization framework where there is a host operating system that contains one or more guest operating systems running, a hypervisor provides a virtual operating platform for the guest operating systems, managing their execution. In such an environment, changes to firewall settings in a guest operating system require reconfiguration of firewall and network address translation (NAT) settings in the host operating system firewall. Heretofore, these reconfigurations must be done manually, which is undesirable for many reasons, including time required, possibility of human errors in making the changes, and the like.

SUMMARY OF THE INVENTION

An object of the invention is to provide a method and apparatus for dynamic configuration of a host operating system firewall when guest operating system settings are modified.

Accordingly, it is another object of the present invention to provide an improved system for dynamically providing host operating system firewall and NAT setting reconfiguration when guest operating system settings are modified.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises monitoring one or more guest operating systems in a virtualized system to dynamically modify the host operating system's firewall and network address translation (NAT) configuration based on the operating system and application configuration of one or more guest operating systems. The host operating system's firewall and network address translation (NAT) configuration are dynamically modified based on the operating system and application configuration of one or more guest operating systems.

The invention operates in an environment where there is a host operating system that contains one or more guest operating systems running in a computer virtualization framework. Furthermore, it operates in an environment where port forwarding is employed to allow external access to applications running in the guest operating system(s).

The method and apparatus are provided in a preferred embodiment running on a test instrument that monitors application performance and network performance. The test instrument includes a host operating system (OS) and one or more guest OS(es). The operations of monitoring the application and network performance are partitioned across the host OS and guest OS(es). The host OS employs a software firewall to prevent undesired network traffic from entering the system, and additionally uses port forwarding, or static network address translation (NAT) to forward packets on to the correct guest OS.

A firewall monitor process runs and monitors the current state of the host operating system's network firewall and the firewalls of the guest operating system(s). If any changes are made to the firewall settings on any of the guest operating systems, the monitoring processes makes the equivalent changes on the host operating system's firewall. Furthermore, when network address translation (NAT) is being used in the virtualization framework, changes made to a guest operating system's firewall will result in changes being made to the NAT settings to allow the appropriate network packets to be forwarded on to the guest operating system.

Figure 1:
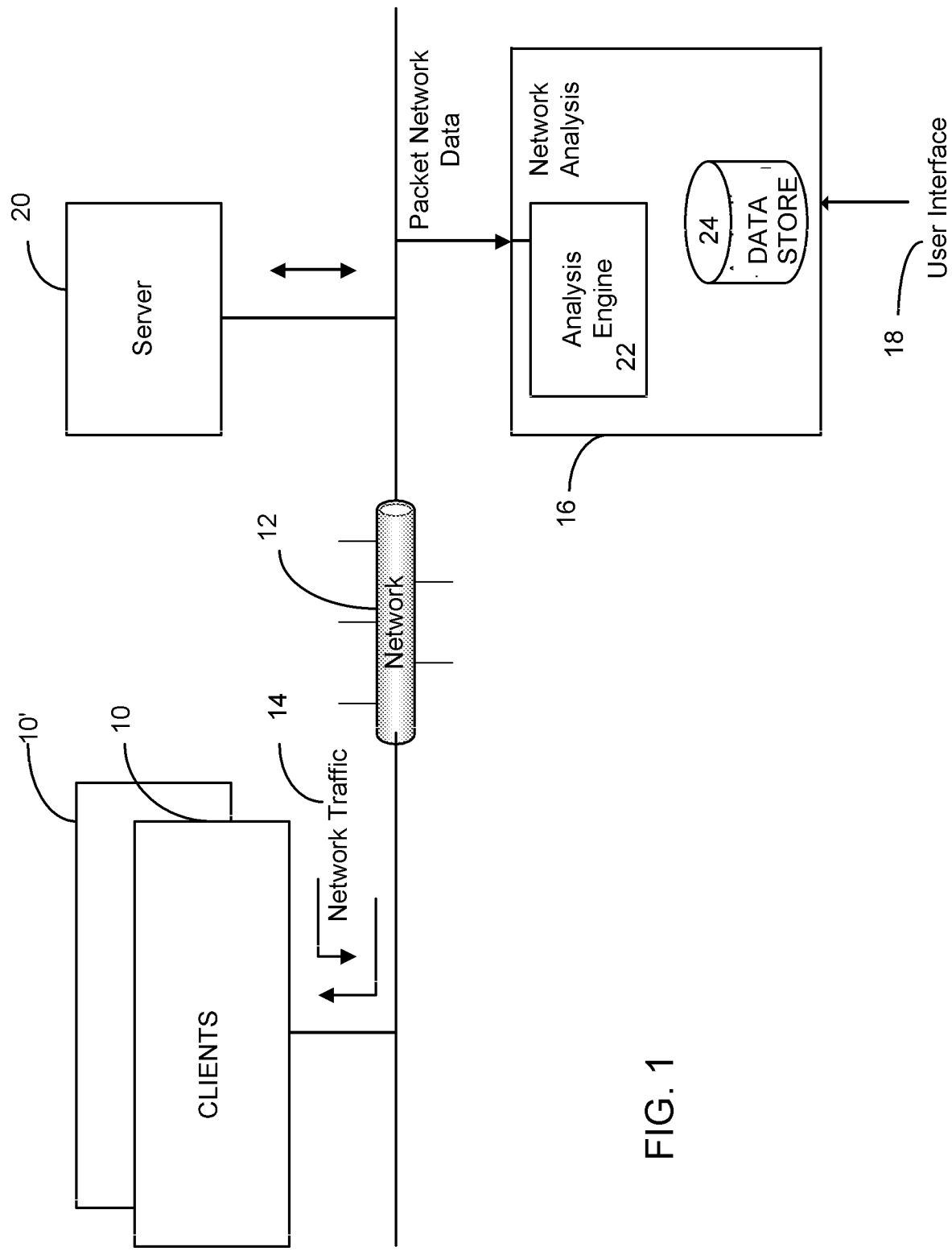
FIG. 1 is a block diagram of a network with a network analysis product interfaced therewith.

Referring to FIG. 1, a block diagram of a network with an apparatus in accordance with the disclosure herein, a network may comprise plural network clients 10, 10', etc., which communicate over a network 12 by sending and receiving network traffic 14 via interaction with server 20. The traffic may be sent in packet form, with varying protocols and formatting thereof.

A network analysis device 16 is also connected to the network, and may include a user interface 18 that enables a user to interact with the network analysis device to operate the analysis device and obtain data therefrom, whether at the location of installation or remotely from the physical location of the analysis product network attachment.

The network analysis device comprises hardware and software, CPU, memory, interfaces and the like to operate to connect to and monitor traffic on the network, as well as performing various testing and measurement operations, transmitting and receiving data and the like. When remote, the network analysis device typically is operated by running on a computer or workstation interfaced with the network. One or more monitoring devices may be operating at various locations on the network, providing measurement data at the various locations, which may be forwarded and/or stored for analysis.

The analysis device comprises an analysis engine 22 which receives the packet network data and interfaces with data store 24.

Figure 2:
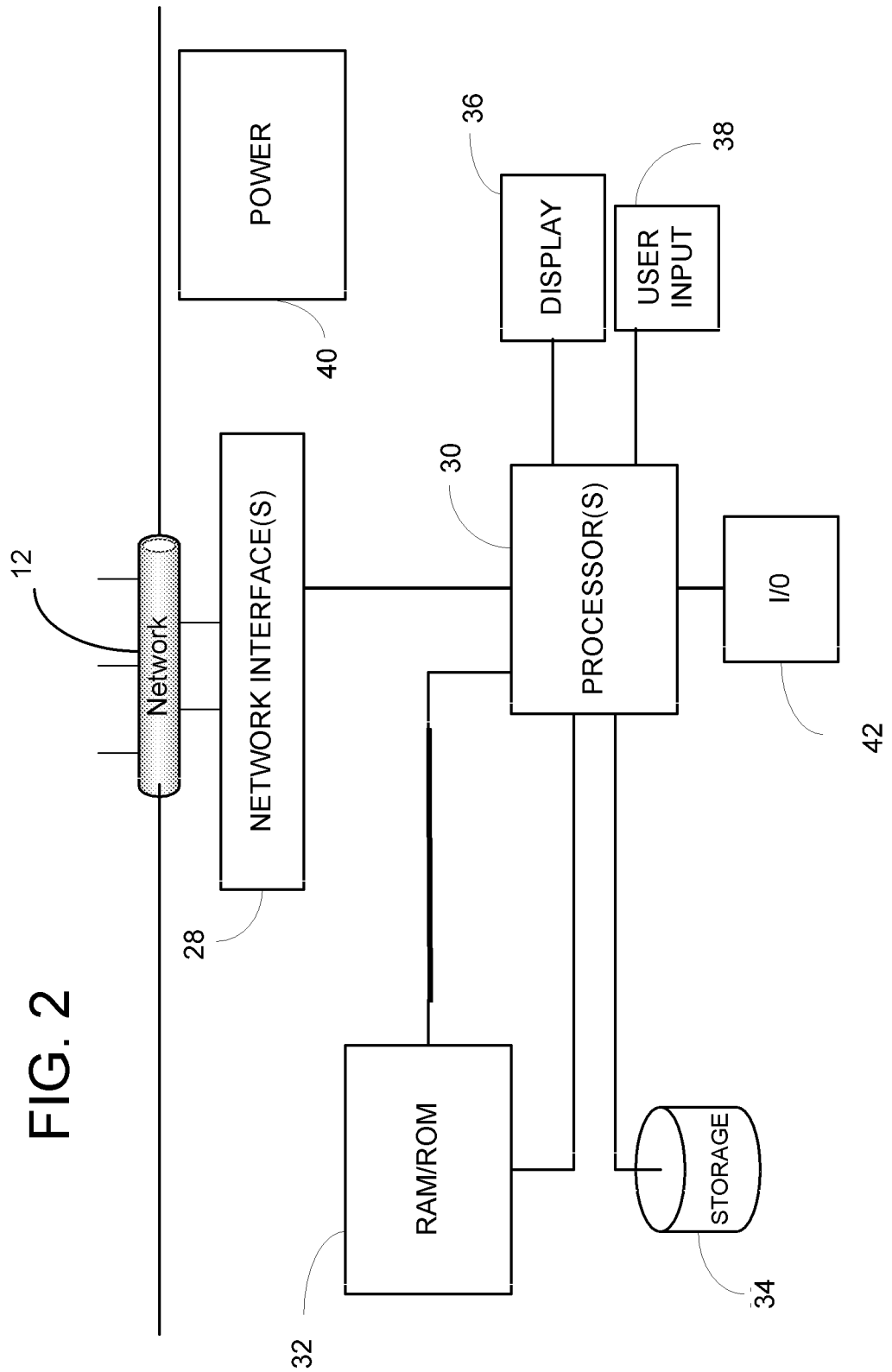
FIG. 2 is a block diagram of a monitor device for estimating application and network performance metrics.

FIG. 2 is a block diagram of a test instrument/analyzer 26 via which the invention can be implemented, wherein the instrument may include network interfaces 28 which attach the device to a network 12 via multiple ports, one or more processors 30 for operating the instrument, memory such as RAM/ROM 32 or persistent storage 34, display 36, user input devices (such as, for example, keyboard, mouse or other pointing devices, touch screen, etc.), power supply 40 which may include battery or AC power supplies, other interface 42 which attaches the device to a network or other external devices (storage, other computer, etc.).

Figure 3:
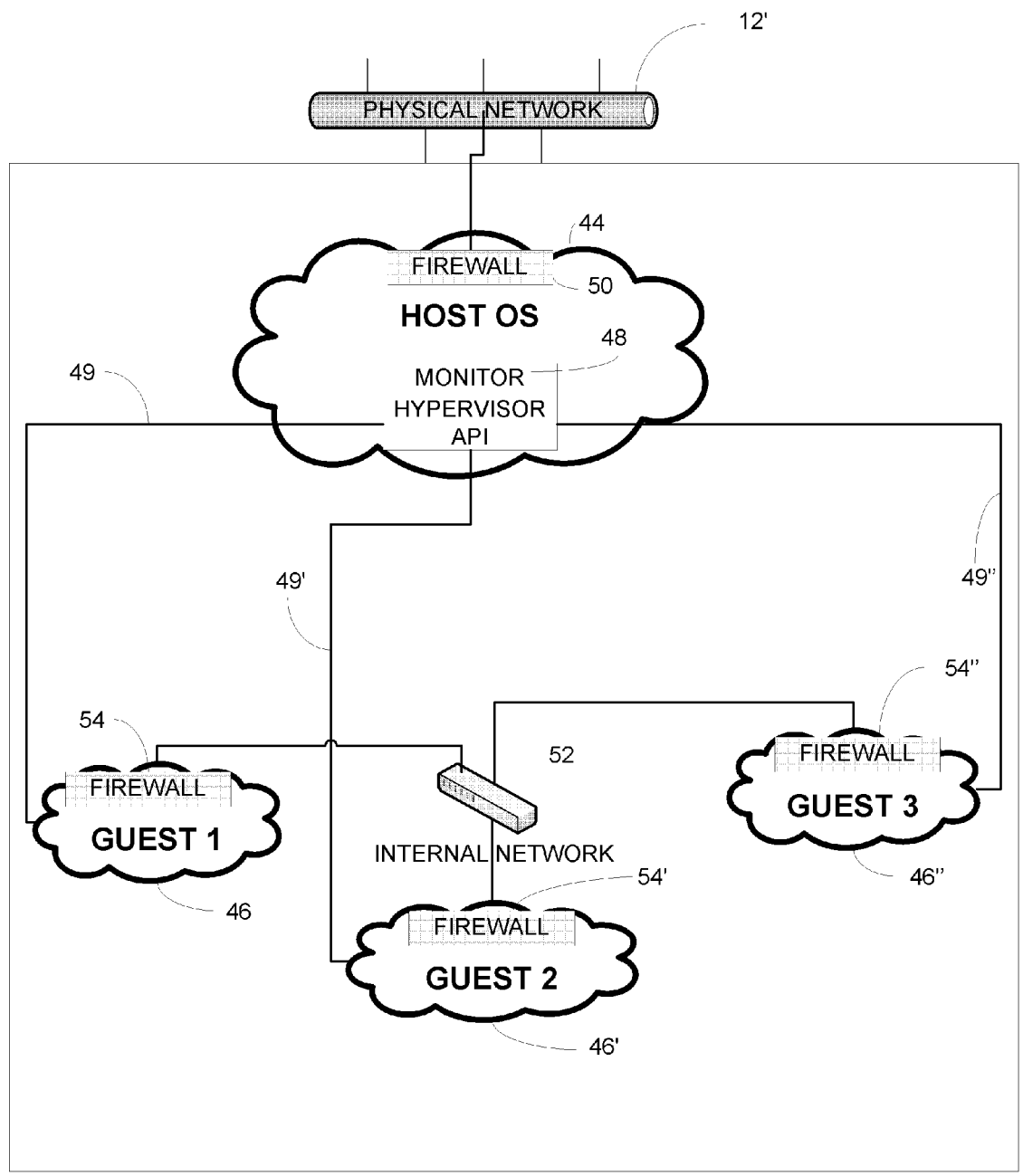
FIG. 3 is diagram of a device in an environment with a host and plural guest operating systems and monitoring in accordance with the present invention.

In operation, with reference to FIG. 3, a high level diagram of the system and operational environment, a test instrument 26' implements the method and apparatus. The instrument connects to the physical network 12' and includes a host operating system 44 supporting one or more guest operating systems, three such guest operating systems 46, 46' and 46" illustrated in FIG. 3. Host operating system 44 has firewall 50 interfacing between the operating system and the physical network 12'. A monitor process 48 operates with the host operating system and via an interface with the hypervisor API (application programming interface) monitors the guest operating systems 46, 46', 46" via the API access 49, 49', 49" to each guest OS. Each guest OS interfaces with the host OS via a virtual internal network 52 via their own respective firewalls 54, 54', 54". This virtual internal network is the one on which NAT port forwarding takes place and on which the guest OS firewalls operate. The host OS firewall will be filtering packets that come in on the connection to the physical network.

Figure 4:
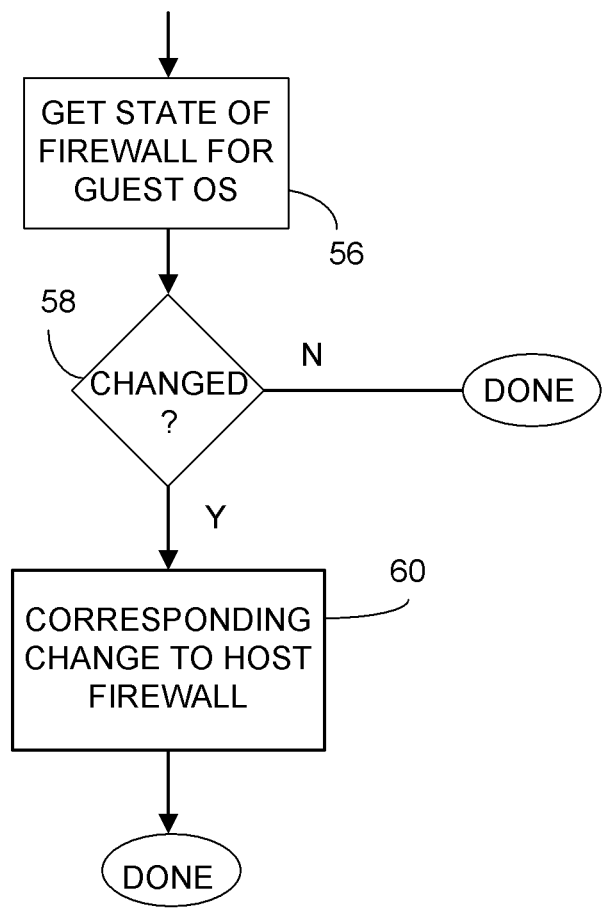
FIG. 4 is a flowchart of operational steps.

In operation, with reference to FIG. 4, firewall monitor 48 periodically reads the firewall settings from a particular guest OS via the hypervisor API (56). When changes are detected (58) in the guest OS firewall settings, the firewall monitor will make similar changes in the host OS firewall (60). The host OS NAT settings will also be changed accordingly. If a new TCP or UDP port is opened on the guest OS firewall, the firewall monitor will open the port on the host OS firewall and change the NAT configuration to forward all packets for that port to the appropriate guest OS. In a corresponding manner, when a previously opened TCP or UDP port is closed on the guest OS firewall, the firewall monitor will close the port on the host OS firewall and will change the NAT configuration to stop forwarding packets for that port to the guest OS. The Hypervisor API provides a way of communicating between the host OS and the guest OSes that does not go through the virtual internal network 52.

In the operation environment discussed herein, it is possible for multiple guest OSes to attempt to open the same port on their respective firewall. In that event, the firewall monitor 48 employs a set of configuration files to determine which guest OS has priority on that port and forwards traffic on that port to the correct guest OS. This provides the ability to prioritize a guest OS for access to a port, rather than relying on a first come first served type of access.

Accordingly, in the illustrated embodiment, the host operating system and guest operating systems are running on a single physical server that is connected to a physical network. A virtual internal network comprising the connections between the monitor/hypervisor API and the guest operating systems provides communication between the host OS and the guest OSes. A system, method and apparatus are provided for dynamic update of host operating system firewall settings when changes to firewall settings are made in a guest operating system, as well as providing a way to prioritize which operating system has preference when more than one guest OS attempts to the same port.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of dynamic host operating system firewall configuration, comprising:
   monitoring the state of guest operating system firewall configuration settings;
   in response to receiving a plurality of requests to use a shared resource from a plurality of guest operating systems, determining which of the plurality of guest operating systems has a priority for the shared resource based upon a plurality of configuration files; and
   in response to detecting a change to guest operating system's firewall configuration settings, making a corresponding change on the host operating system firewall configuration settings and making a corresponding change on the host operating system Network Address Translation (NAT) settings, wherein
   said monitoring, determining which of the plurality of guest operating systems has a priority in response to receiving the plurality of requests, and making corresponding changes in response to detecting the change to guest operating system's firewall configuration settings are performed by a network analysis device having a processor that monitors application performance and network performance of a network under test and wherein the network analysis device further comprises one or more monitoring devices having a processor and positioned at various locations on the network under test, the one or more monitoring devices configured to provide measurement data to the network analysis device and configured to store for later analysis the measurement data as measured at the various locations.

2. The method according to claim 1, further comprising forwarding the measurement data from the one or more monitoring devices to the network analysis device as measured at the various locations.

3. The method according to claim 1, further comprising providing a user interface that enables a user to interact with the network analysis device to operate the network analysis device and obtain data therefrom.

4. The method according to claim 3, wherein said user interface is located at the network analysis device.

5. The method according to claim 3, wherein said user interface is located remotely from the physical location of the network analysis device's attachment point to the network under test.

6. The method according to claim 1, wherein said network analysis device performs testing and measurement operations on the network.

7. A network test instrument that monitors application performance and network performance for dynamic host operating system firewall configuration, the network test instrument comprising:
   one or more hardware processors, one or more computer-readable storage devices, and a plurality of program instructions stored on at least one of the one or more storage devices for execution by at least one of the one or more processors, the plurality of program instructions comprising:
   program instructions to connect the network test instrument to a network under test;
   program instructions to monitor a guest firewall configuration status;
   program instructions to provide and store measurement data as measured at various locations on the network;
   program instructions to determine which of a plurality of guest operating systems has priority for access to a shared resource based upon a plurality of configuration files in response to receiving a plurality of requests to use the shared resource from the plurality of guest operating systems; and
   program instructions to update the host firewall configuration and to update Network Address Translation (NAT) settings of the host operating system when a status change is detected in a guest firewall configuration.

8. The network test instrument according to claim 7, wherein one or more monitoring devices forward the measurement data to the network test instrument.

9. The network test instrument according to claim 7, further comprising a user interface that enables a user to interact with the network test instrument to operate the network test instrument and obtain data therefrom.

10. The network test instrument according to claim 9, wherein said user interface is located at the network test instrument.

11. The network test instrument according to claim 9, wherein said user interface is located remotely from the physical location of the network test instrument's attachment point to the network under test.

12. The network test instrument according to claim 7, wherein said plurality of program instructions further comprises program instructions to perform testing and measurement operations on the network.

* * * * *